United States Patent
Sun et al.

(10) Patent No.: US 9,385,640 B2
(45) Date of Patent: Jul. 5, 2016

(54) CONTROL CIRCUIT FOR A DC MOTOR

(71) Applicant: Johnson Electric S.A., Murten (CH)

(72) Inventors: Chi Ping Sun, Shatin (HK); Fei Xin, Shatin (HK); Xiu Wen Yang, Shatin (HK); Shing Hin Yeung, Shatin (HK); Yun Long Jiang, Shatin (HK); Yan Yun Cui, Shatin (HK); Sin Sang Wong, Shatin (HK); Zhu Qing Yi, Shatin (HK)

(73) Assignee: JOHNSON ELECTRIC S.A., Murten (CH)

( * ) Notice: Subject to any disclaimer, the term of this patent is extended or adjusted under 35 U.S.C. 154(b) by 73 days.

(21) Appl. No.: 14/555,394

(22) Filed: Nov. 26, 2014

(65) Prior Publication Data

US 2015/0145450 A1    May 28, 2015

(30) Foreign Application Priority Data

Nov. 27, 2013   (CN) .......................... 2013 1 0616819

(51) Int. Cl.
| | |
|---|---|
| *H02P 6/18* | (2016.01) |
| *H02P 6/00* | (2016.01) |
| *H02P 3/12* | (2006.01) |
| *H02P 7/285* | (2016.01) |

(52) U.S. Cl.
CPC  *H02P 6/002* (2013.01); *H02P 3/12* (2013.01); *H02P 7/285* (2013.01)

(58) Field of Classification Search
CPC ................................. H02P 3/12; H02P 7/285
USPC ..................... 318/400.34, 363; 324/160–180; 363/236–244
See application file for complete search history.

(56) References Cited

U.S. PATENT DOCUMENTS

| | | | | |
|---|---|---|---|---|
| 3,508,134 A * | 4/1970 | Dosch | ..................... | H02P 7/295 323/327 |
| 3,614,578 A * | 10/1971 | Woodward | ................ | B66B 9/10 318/467 |
| 3,634,874 A * | 1/1972 | Mason | ..................... | H02P 25/10 388/819 |
| 3,664,129 A * | 5/1972 | Schwab | .................. | F01P 7/044 137/468 |
| 3,705,337 A * | 12/1972 | Grabl | .................... | H02P 7/2855 388/816 |
| 3,783,361 A * | 1/1974 | Mason | ..................... | H02P 7/293 388/820 |
| 4,163,182 A * | 7/1979 | Tanikoshi | ............. | H02P 7/2885 388/822 |
| 4,232,258 A * | 11/1980 | Matsumura | ............. | H02P 7/293 388/830 |
| 4,390,824 A * | 6/1983 | Brown | .................... | H02P 25/10 388/820 |
| 4,644,206 A * | 2/1987 | Smith | ..................... | H02P 17/00 310/102 R |
| 4,803,410 A * | 2/1989 | Shinohara | ............... | H02P 7/291 388/822 |
| 4,831,312 A * | 5/1989 | Okazaki | .................. | H02P 7/288 388/815 |
| 4,905,300 A * | 2/1990 | Bhagwat | ............... | H02P 25/145 307/80 |
| 4,935,678 A * | 6/1990 | Houst | ..................... | H02P 25/14 318/245 |
| 5,063,911 A * | 11/1991 | Teranishi | ........... | A61H 15/0078 428/116 |
| 6,114,826 A | 9/2000 | Nishiura et al. | | |

(Continued)

*Primary Examiner* — Rita Leykin
(74) *Attorney, Agent, or Firm* — Muncy, Geissler, Olds & Lowe, P.C.

(57) ABSTRACT

A control circuit for a DC motor, has: a first and second input ports for connection to a DC source; a H-bridge driving circuit, having first and second switches connected in series between the input ports, and third and fourth switches connected in series between the input ports, a first output port between the first and second switches and a second output port between the third and fourth switches, and a shunt circuit and/or a blocking circuit. The motor is connected between the first and second output ports. The shunt circuit is connected between the first second output ports and has a resistance that will decrease in response to BEMF generated by the motor. The blocking circuit is connected in series with the motor between the output ports and has a resistance that increases in response to BEMF generated by the motor.

24 Claims, 5 Drawing Sheets

(56) References Cited

U.S. PATENT DOCUMENTS

| | | | | |
|---|---|---|---|---|
| 6,304,045 B1* | 10/2001 | Muszynski | ............ | H02K 3/28 318/400.09 |
| 6,545,886 B1* | 4/2003 | Ireland | ................ | H02M 7/125 363/132 |
| 6,617,816 B2* | 9/2003 | Ohno | .................... | H02K 23/66 318/245 |
| 6,628,893 B2* | 9/2003 | Ohno | .................... | H02K 23/66 318/245 |
| 7,397,212 B2* | 7/2008 | Turner | .................. | H02P 23/14 318/561 |
| 7,528,583 B2* | 5/2009 | Takeuchi | ............ | H02K 11/215 318/757 |
| 7,902,778 B2* | 3/2011 | Yamashita | ............... | G11B 5/54 318/400.01 |
| 8,089,231 B2* | 1/2012 | Takeuchi | ................ | H02P 6/16 318/400.02 |
| 8,963,473 B2* | 2/2015 | Lauwaert | ................ | H02P 8/34 318/34 |

* cited by examiner

CONTROL CIRCUIT FOR A DC MOTOR

CROSS REFERENCE TO RELATED APPLICATIONS

This non-provisional patent application claims priority under 35 U.S.C. §119(a) from Patent Application No. 201310616819.6 filed in The People's Republic of China on 27 Nov. 2013.

FIELD OF THE INVENTION

This invention relates to a control circuit for a DC (Direct Current) motor, and in particular, to a control circuit with a protection function for a DC motor.

BACKGROUND OF THE INVENTION

A cooling or exhaust fan, which has a DC motor, is usually designed to rotate in only one direction. However, there is a possibility that the fan doesn't rotate in the pre-determined direction in some abnormal situation. For example, when a cooling fan, positioned at the front of a car, is facing against a strong wind during the car's running, or an exhaust fan for a kitchen is subjected to a strong wind from the outside to the inside, the fans may rotate in the reverse direction, resulting in an inability to cool or exhaust as expected.

One resolution to this problem is to install several backwind shutters beside the fan, for instance, in front of the aforesaid fan in the car or on the outside of the aforesaid fan in the kitchen, and the shutters are designed to open only in a predetermined direction. In the ordinary working state, the fan normally realizes the effect of cooling or exhausting after the shutters are blown open by the wind generated by the fan. When a contrary wind occurs which is stronger than the wind generated by the fan, the shutters are blown closed and leave the contrary wind outside to prevent the fan from being driven in the reverse direction.

On the other hand, in the non-working state, when there is a strong wind blowing in the same direction as that of the wind generated by the fan, such as a wind blows from the inside to the outside, the blades of the fan will be pressed by the strong wind while the shutters are blown open, and then the fan will be forced to rotate and create a BEMF (Back Electromotive Force), leading to the fan operating as an electric generator. This may damage the control circuit for the fan if the generated BEMF is too high.

SUMMARY OF THE INVENTION

Hence there is a desire for a control circuit for a DC motor which won't be damaged by BEMF.

Accordingly, in one aspect thereof, the present invention provides a control circuit for a DC motor, comprising: a first DC port and a second DC port for connection to a DC source; a H-bridge driving circuit, comprising a first switch and a second switch connected in series between the first and second DC ports, and a third switch and a fourth switch connected in series between the first and second DC ports, a first output port lying between the first and the second switches and a second output port lying between the third and the fourth switches, the output ports being arranged for connection to the DC motor; and a shunt circuit connected between the first and second output ports and having a resistance that will decrease in response to a BEMF generated by the DC motor.

Preferably, the shunt circuit comprises a varistor.

Preferably, the shunt circuit further comprises a first resistor connected in series with the varistor.

Preferably, the four switches are transistors having a respective control end, a second resistor is connected between the first and the second DC ports, a third resistor is connected between the control end of the first switch and the second output port, and a fourth resistor is connected between the control end of the third switch and the first output port.

Preferably, a zener diode is connected in series with the second resistor between the first and the second DC ports.

Preferably, a capacitor is connected between the first and the second DC ports.

Alternatively, the shunt circuit comprises a relay connected between the first and second output ports, and a control unit connected to the relay for controlling the relay to close when a voltage between the first and the second DC ports is higher than a predetermined value.

Preferably, the control unit comprises a voltage detecting circuit connected between the first and second DC ports, and a controller connected to the voltage detecting circuit and the relay; the voltage detecting circuit detecting the voltage between the first and the second DC ports; and the controller controlling the relay to close when a voltage higher than a predetermined value is detected by the voltage detecting circuit.

According to a second aspect, the present invention provides a control circuit for a DC motor, comprising: a first DC port and a second DC port for connection to a DC source; a H-bridge driving circuit, comprising a first switch and a second switch connected in series between the first and second DC ports, and a third switch and a fourth switch connected in series between the first and second DC ports, a first output port lying between the first and the second switches and a second output port lying between the third and the fourth switches, the output ports being arranged for connection to the DC motor; and a blocking circuit connected in series with the DC motor between the first and second output ports and having a resistance that will increase in response to a BEMF generated by the DC motor.

Preferably, the blocking circuit comprises a relay connected in series with the DC motor between the first and the second output ports, and a control unit connected to the relay for controlling the relay to open when a voltage between the first and second DC ports is higher than a predetermined value.

Preferably, the control unit comprises a voltage detecting circuit connected between the first and second DC ports, and a controller connected to the voltage detecting circuit and the relay; the voltage detecting circuit detecting the voltage between the first and the second DC ports; and the controller controlling the relay to open when a voltage higher than a predetermined value is detected by the voltage detecting circuit.

Preferably, the blocking circuit comprises a PTC thermistor connected in series with the DC motor between the first and the second output ports.

Preferably, a second resistor connected between the first and the second DC ports is located close to or in contact with the PTC thermistor.

Preferably, the four switches are transistors with a respective control end, a second resistor is connected between the first and the second DC ports, a third resistor is connected between the control end of the first switch and the second output port, and a fourth resistor is connected between the control end of the third switch and the first output port.

Preferably, a zener diode is connected in series with the second resistor between the first and second DC ports.

Preferably, a capacitor is connected between the first and second DC ports.

Alternatively, the blocking circuit comprises two transistors with contrary polarities to each other connected to respective terminals of the DC motor and in series between the first and second output ports.

According to a third aspect, the present invention provides a control circuit for a DC motor, comprising: a first DC port and a second DC port for connection to a DC source; a H-bridge driving circuit, comprising a first switch and a second switch connected in series between the first and second DC ports, and a third switch and a fourth switch connected in series between the first and second DC ports, a first output port lying between the first and the second switches and a second output port lying between the third and the fourth switches, the output ports being arranged for connection to the DC motor; a shunt circuit connected between the first and second output ports and having a resistance that will decrease in response to a BEMF generated by the DC motor; and a blocking circuit connected in series with the DC motor between the first and second output ports and having a resistance that will increase in response to a BEMF generated by the DC motor.

Preferably, the four switches are transistors with a respective control end, a second resistor and a zener diode are connected in series between the first and second DC ports, a third resistor is connected between the control end of the first switch and the second output port, a fourth resistor is connected between the control end of the third switch and the first output port, and the blocking circuit comprises a PTC thermistor.

Preferably, the PTC thermistor is located close to or in contact with the second resistor.

Preferably, a capacitor is connected between the first and second DC ports.

Preferably, the shunt circuit comprises a varistor.

Preferably, the shunt circuit further comprises a first resistor connected in series with the varistor.

In the present invention, the shunt circuit, the blocking circuit or the both, regardless the direction of the BEMF generated by the DC motor, can inhibit the current produced by the BEMF, thus protecting the whole circuitry.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
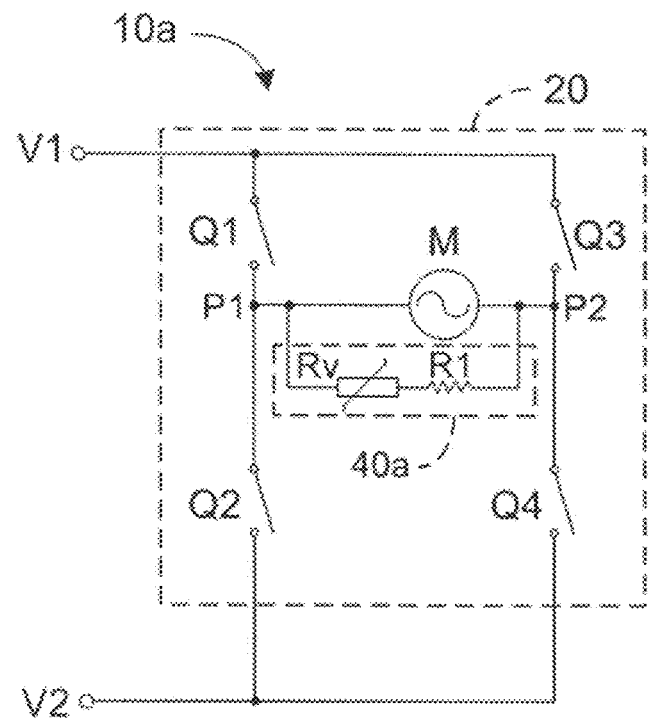
FIG. 1 is a schematic of a control circuit for a DC motor according to a first embodiment of the present invention.

Referring to FIG. 1, a control circuit 10a for a DC motor according to a first embodiment of the present invention, which is used to drive a DC motor M, comprises a first DC port V1, a second DC port V2, a H-bridge driving circuit 20 and a shunt circuit 40a.

The first and the second DC ports V1, V2 are used to connect to a DC source. H-bridge driving circuit 20 comprises a first switch Q1, a second switch Q2, a third switch Q3 and a fourth switch Q4, each of which has a control end applied for controlling its on-off. All the aforesaid switches can be BJT (Bipolar Junction Transistor), MOSFET (Metal Oxide Semiconductor Field Effect Transistor) or other kind of transistors, and every switch within itself defines a diode that, for example, is between its collector and emitter electrode if it is a BJT, or between its source and drain electrode if it is a MOSFET. It is pointed out that every switch in this or any other embodiment of the present invention may be represented simply by a graphic switch symbol in relevant figures, while its control end as well as a switch control circuit, by which the switching order of the four switches are controlled through the control ends so as to make the DC motor work, aren't depicted.

The combination of the first and the second switches Q1, Q2 in series and the combination of the third and the fourth switches Q3, Q4 in series are both connected between the first and the second DC ports V1, V2. There are a first output port P1 lying between the first and the second switches Q1, Q2 and a second output port P2 lying between the third and the fourth switches Q3, Q4. Both the first and the second output ports Pl, P2 are used to connect to the DC motor. The shunt circuit 40a, whose resistance will decrease when a BEMF is generated by the DC motor, is connected in parallel with the DC motor between the first and the second output ports P1, P2. The shunt circuit 40a includes a varistor Rv.

In the ordinary working state, in order to allow the DC motor to run normally, the first and the fourth switches Q1, Q4 are both controlled to switch on simultaneously while the second and the third switches Q2, Q3 are both controlled to switch off simultaneously, resulting in a current flowing in a first direction, e.g. from the left towards the right as shown in FIG. 1; and then the second and the third switches Q2, Q3 are both controlled to switch on simultaneously while the first and the fourth switches Q1, Q4 are both controlled to switch off simultaneously, resulting in a current flowing in a second direction, e.g. from the right towards the left as shown in FIG. 1. When the DC motor is accelerated to a speed faster than the normal speed during its ordinary running process or is compelled to rotate during its non-working period by an external force, which respectively leads to a BEMF, the voltage on the DC motor will change, and the resistance of the varistor Rv will reduce accordingly in line with the varistor's own characteristics, thus the BEMF will be consumed by a loop formed by the varistor Rv, thereby avoiding other electronic components being damaged by the BEMF.

It is known to those skilled in the art that the varistor Rv can be replaced by a TVS(Transient Voltage Suppressor) that has similar capabilities to that of the varistor Rv.

Preferably, the shunt circuit 40a further comprises a first resistor R1 used for sharing the voltage on the varistor Rv when a BEMF is generated by the DC motor in order to lower the temperature of the varistor Rv.

Optionally, the single shunt circuit 40a may be replaced by a plurality of shunt circuits 40a that are all connected in parallel.

Figure 2:
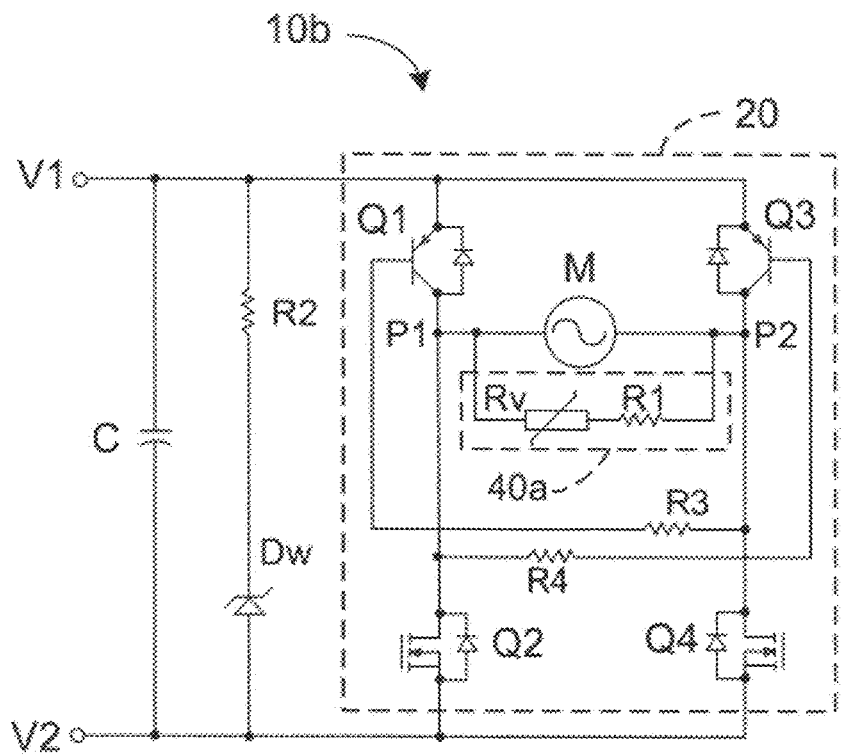
FIG. 2 is a schematic of a control circuit for a DC motor according to a second embodiment of the present invention.

Referring to FIG. 2, a control circuit 10b for a DC motor according to a second embodiment of the present invention is different from control circuit 10a according to the first embodiment in that control circuit 10b further comprises a second resistor R2, a zener diode Dw, a third resistor R3 and a fourth resistor R4. Specifically, the second resistor R2 and the zener diode Dw are connected in series between the first and the second DC ports V1, V2; the third resistor R3 is connected between the control end of the first switch Q1 and the second output port P2; and the fourth resistor R4 is connected between the control end of the third switch Q3 and the first output port P1.

When the DC motor is forced to rotate by an external force so as to generate a BEMF, besides the shunting loop, which is formed from the varistor Rv and described in the first embodiment, acting as a main shunt branch circuit, there will be another two loops acting respectively as another two shunt branch circuits, one of which, named first loop, is formed by the diode defined inside the first switch Q1 itself, to the second resistor R2, to the zener diode Dw, to the diode defined inside the fourth switch Q4 itself, back to the DC motor in the end, and the other one of which, named second loop, is formed by the collector electrode of the first switch Q1, to its base electrode, to the third resistor R3, back to the DC motor in the end.

Based on similar principles to the aforesaid, when the DC motor is forced to rotate in a reverse direction by an external force so as to generate a BEMF with a polarity opposite to that of the aforesaid one, there will be another two loops that are symmetric to the first and the second loops aforesaid respectively and contain the second and the fourth resistors R2, R4 respectively.

Therefore, regardless of the direction of the BEMF, there are two further loops for shunting besides the aforesaid main loop for shunting containing the varistor Rv and as a result, the other electronic components are better protected.

Preferably, a capacitor C, is connected between the first and the second DC ports V1, V2 to filter the voltage.

It is pointed out that triodes, shown in FIG. 2, can be used as the switches in this embodiment just to make it easy to understand that the diodes defined respectively inside corresponding switches are linked respectively in the loops for shunting that contain the third and the fourth resistors R3, R4 respectively. Those skilled in the art will understand that the types of the switches are more than that shown in FIG. 2, which won't be explained again in similar situations in the following embodiments.

In addition, it is understandable that the varistor Rv still operates normally to shunt the current generated by the BEMF even without the zener diode Dw of other embodiments, that is, the zener diode Dw isn't essential, which won't be repeated in some or all of the following embodiments which share the same principles.

Figure 3:
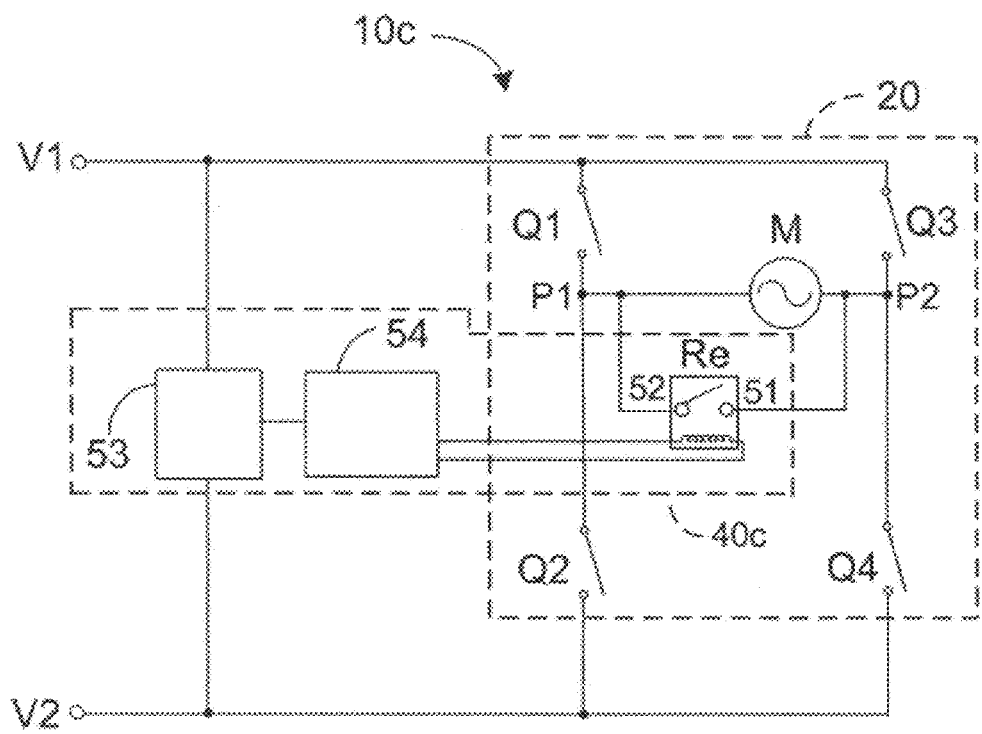
FIG. 3 is a schematic of a control circuit for DC a motor according to a third embodiment of the present invention.

Referring to FIG. 3, a control circuit 10c for a DC motor according to a third embodiment is different from the control circuit 10a in that the aforesaid varistor Rv included in the shunt circuit 40a is substituted by a relay Re. Specifically, the shunt circuit 40c includes: a relay Re with a first contact 51 connected to the second output port P2 and with a second contact 52 connected to the first output port P1; a voltage detecting circuit 53 for detecting the voltage between the first and the second DC ports V1, V2; and a controller 54, connected between the voltage detecting circuit 53 and the relay Re, for controlling the relay Re to close when a voltage higher than a predetermined value is detected by the voltage detecting circuit 53. Optionally, the voltage detecting circuit 53 and the relay Re are integrated into a control unit.

Thus, when the DC motor is forced to rotate by an external force so as to generate a BEMF, the voltage between the first and the second DC ports V1, V2 will change, and then the controller 54 controls the relay Re to close to complete the shunt circuit, if a voltage higher than a predetermined value is detected by the voltage detecting circuit 53, thereby protecting other electronic components.

It is understandable that the relay Re could be substituted with a component with similar function, such as a thyristor, a TRIAC, a transistor, a MOSFET, an avalanche diode and so on.

Figure 4:
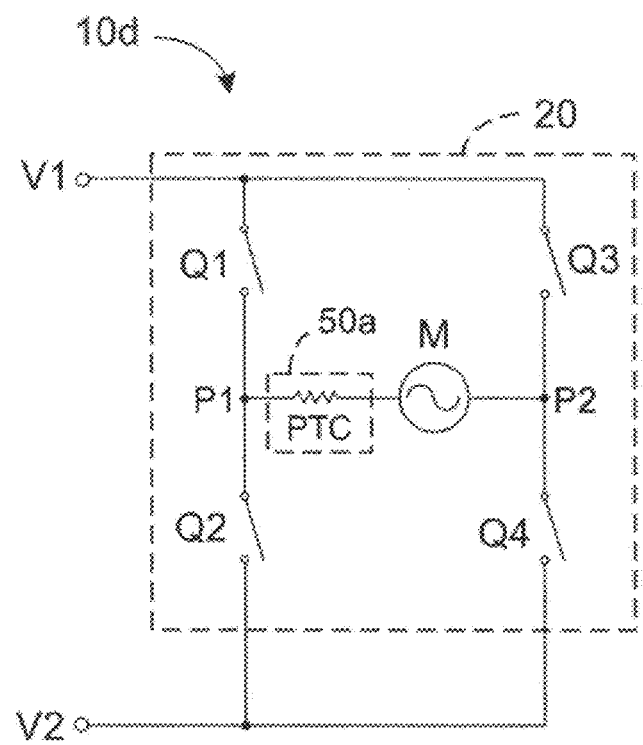
FIG. 4 is a schematic of a control circuit for a DC motor according to a fourth embodiment of the present invention.

Referring to FIG. 4, a control circuit 10d for a DC motor according to a fourth embodiment is different from the control circuit 10a according to the first embodiment in that aforesaid shunt circuit 40a is substituted by a blocking circuit 50a including a thermistor having a positive temperature coefficient (PTC). The blocking circuit is placed in series with the motor between the first and second output ports P1, P2. Thus, when the DC motor is forced to rotate by an external force so as to generate a BEMF that increases the current across the PTC thermistor, the temperature of the thermistor will increase and the resistance will increase significantly almost simultaneously, and thereby the BEMF will be restrained to protect the electronic components of control circuit 10d.

Figure 5:
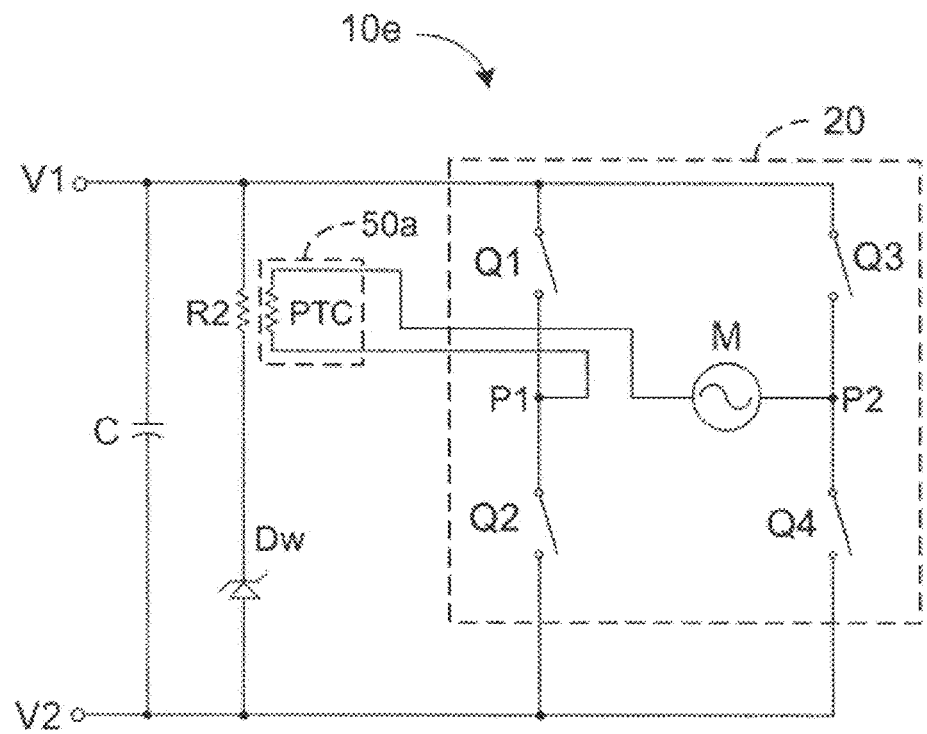
FIG. 5 is a schematic of a control circuit for a DC motor according to a fifth embodiment of the present invention.

Referring to FIG. 5, a control circuit 10e for a DC motor according to a fifth embodiment is different from the control circuit 10d according to the fourth embodiment in the location of the PTC thermistor on the actual circuit board as well as in that the control circuit 10e further comprises a second resistor R2 and a zener diode Dw. The second resistor R2 and the zener diode Dw are connected in the same way according to the second embodiment. According to the fifth embodiment, the PTC thermistor and the second resistor R2 are located close to or in contact with each other on a completed circuit board. The BEMF generated by the DC motor will induce a current across the second resistor R2 in the same way according to the second embodiment, so as to increase its temperature which is advantageous for accelerating heating of the PTC thermistor. As a result, the resistance of the PTC thermistor will increase faster, thereby protecting other electronic components.

Figure 6:
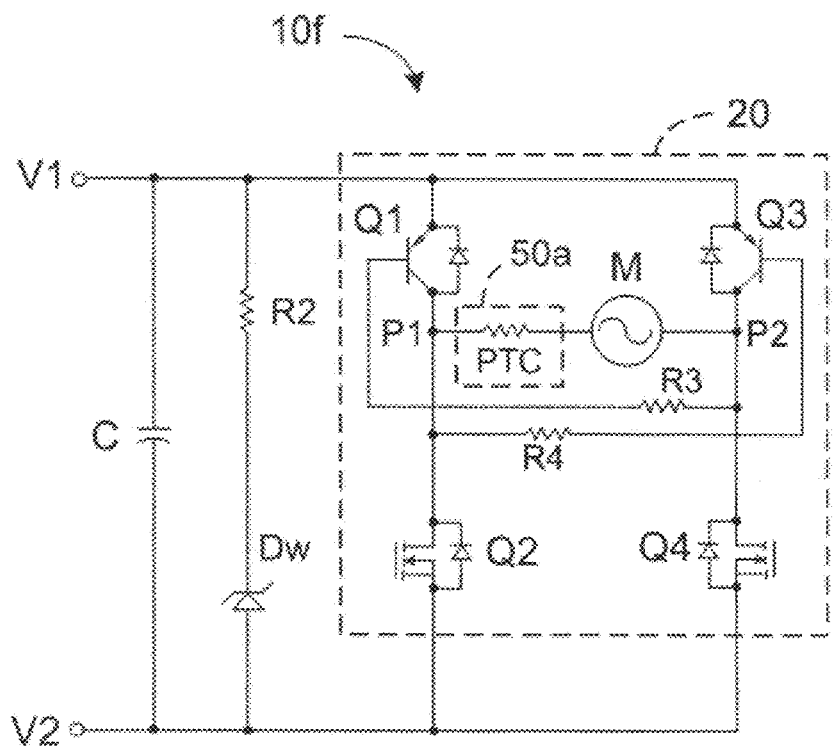
FIG. 6 is a schematic of a control circuit for a DC motor according to a sixth embodiment of the present invention.

Referring to FIG. 6, a control circuit 10f for a DC motor according to a sixth embodiment is different from the control circuit 10e according to the fifth embodiment in that the control circuit 10f further comprises a third resistor R3 and a fourth resistor R4, similar to the arrangement shown in the second embodiment. A BEMF in any direction, which is generated by the DC motor, leads to an increasing current across the PTC thermistor due to the two loops that contain the second and the third resistors R2, R3 respectively or the two loops that contain the second and the fourth resistors R2, R4 respectively, giving rise to a further increase in the temperature and then a rapid increase of the resistance of the PTC thermistor. It is necessary to point out that the physical location of the PTC thermistor could be far from, close to or in contact with the second resistor R2 in the actual circuit.

In the fourth, the fifth and the sixth embodiments, the single blocking circuit may be replaced by a plurality of blocking circuits 50c connected in series, in order to achieve a better blocking effect. The plurality of blocking circuits are connected in series with the DC motor between the first and the second output ports P1, P2.

Figure 7:
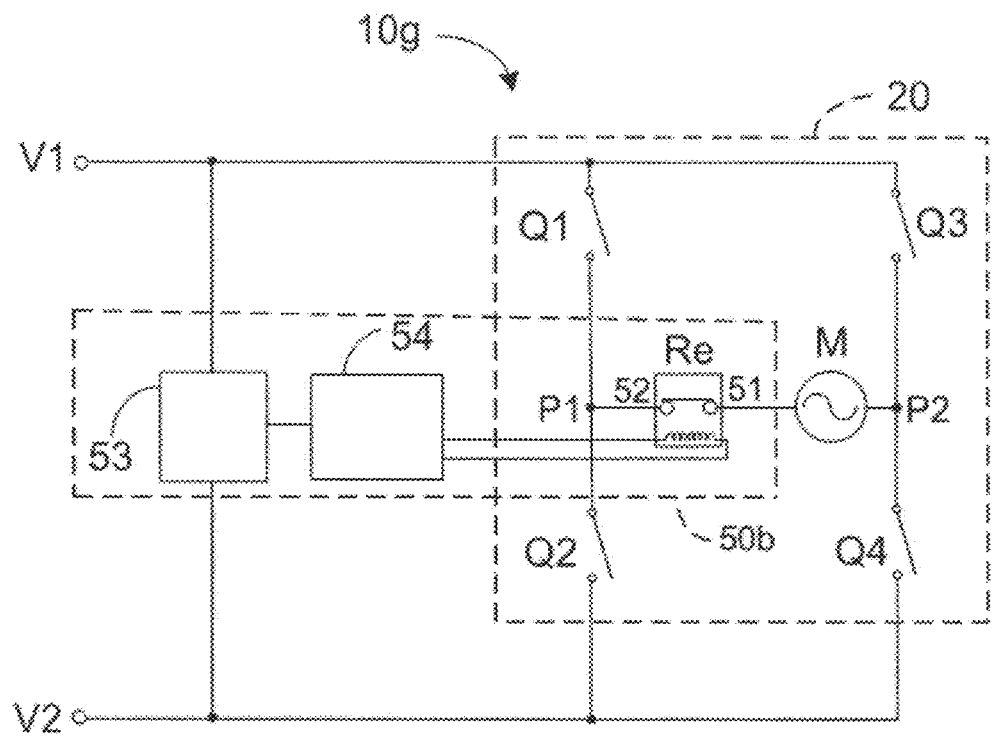
FIG. 7 is a schematic of a control circuit for a DC motor according to a seventh embodiment of the present invention.

Referring to FIG. 7, a control circuit 10g for a DC motor according to a seventh embodiment is different from the control circuit 10d according to the fourth embodiment in that the aforesaid PTC thermistor is substituted by a relay Re in the blocking circuit 50b. Specifically, the blocking 50b comprises a relay Re, a voltage detecting circuit 53 and a controller 54. Except that the relay Re is connected to the DC motor M in series between the first and the second outputs P1, P2, the detecting voltage circuit 53 and the controller 54 are connected in the same way as in the third embodiment and work on the same principles, which won't be reiterated here.

Figure 8:
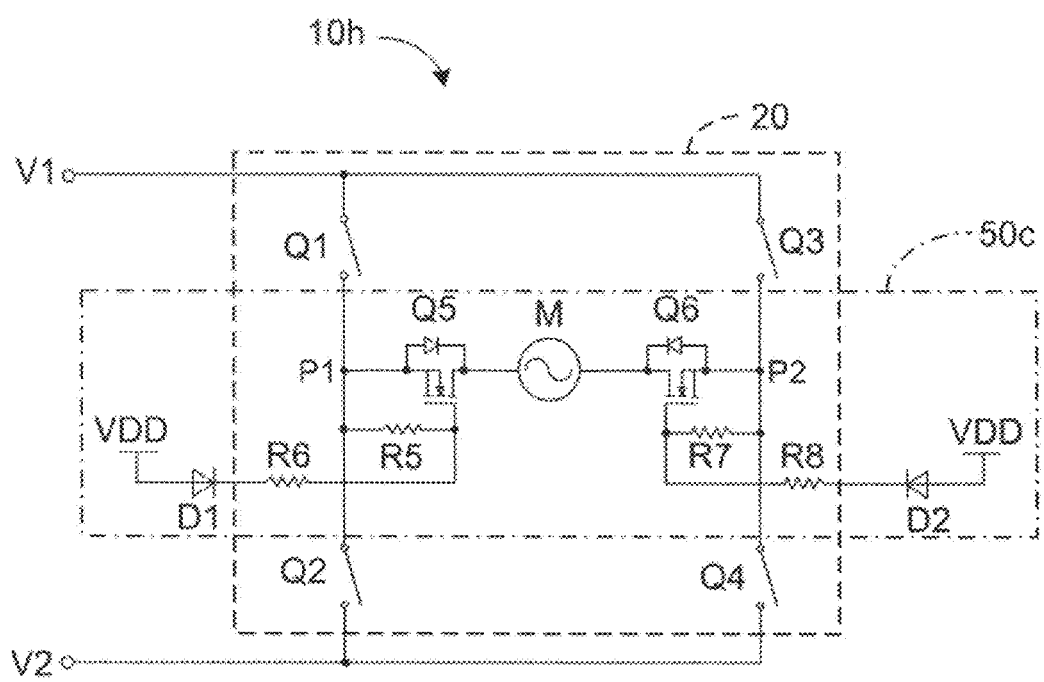
FIG. 8 is a schematic of a control circuit for a DC motor according to an eighth embodiment of the present invention.

Referring to FIG. 8, a control circuit 10h for a DC motor according to an eighth embodiment is different from the control circuit 10d according to the fourth embodiment in that the blocking circuit 50c comprises two transistors Q5 and Q6 with contrary polarities to each other (that is, the diodes defined within themselves respectively are with contrary polarities to each other) and connected to respective terminals of the DC motor in series between the two output ports P1, P2. Although the transistors are shown as MOSFETs in this embodiment, BJT or other transistors can be available alternatives. Furthermore, the source electrode of the transistor Q5 is connected to the first output port P1, its drain is connected to the DC motor, and its grid is connected to the first output port P1 through a fifth resistor R5 as well as to a control site Vdd through a resistor R6 and a first diode D1 successively. Transistor Q6 is connected in a similar way.

Thus, in the ordinary working state, the control site is input a positive voltage, and when the second and the third switches Q2, Q3 are controlled to switch on simultaneously while the first and the fourth switches Q1, Q4 are controlled to switch off simultaneously, the transistor Q6 will cut off, whereas a portion of current will pass through the diode defined within the transistor Q6 itself towards the DC motor, and because of that, the transistor Q5, with polarities contrary to that of the transistor Q6, will turn on. As a result, the DC motor will operate normally. On the contrary, when the first and the fourth switches Q1, Q4 are controlled to switch on simultaneously while the second and the third switches Q2, Q3 are controlled to switch off simultaneously, a current will pass through the diode defined within the transistor Q5 itself, and a loop that contains the DC motor M and the transistor Q6 is formed.

When a BEMF is generated by the DC motor, the control site Vdd is earthed leading to both of the transistors Q5 and Q6 being cut off, thus, the BEMF is unable to cause a current through the transistors Q5 and Q6, thereby protecting other electronic components. Of course, transistors Q5 and Q6 are connected to relevant control sites, so as to that both transistors turn on simultaneously during normal operation of the DC motor while cut off simultaneously when BEMF is generated.

Figure 9:
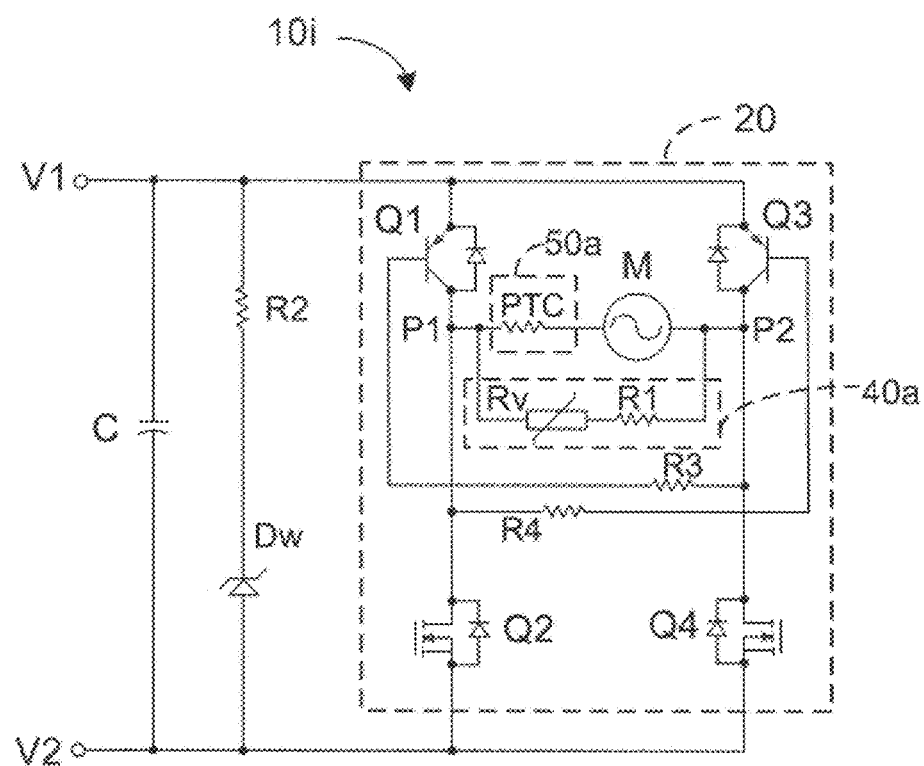
FIG. 9 is a schematic of a control circuit for a DC motor according to a ninth embodiment of the present invention.

Referring to FIG. 9, a control circuit 10i for a DC motor according to a ninth embodiment can be considered as a combination of the control circuit 10a according to the first embodiment and the control circuit 10d according to the fourth embodiment. In this embodiment the shunt circuit 40a is connected in parallel or across the series combination of the DC motor M and a blocking circuit 50a incorporating a PTC thermistor. Thus, even though a BEMF generated by the DC motor is low, a larger current across the PTC thermistor will occur due to the reduction of the resistance of the varistor Rv, resulting in a more rapid increase of the resistance of the PTC thermistor, thereby benefiting the protection of other electric components. Of course, as described in the fourth embodiment, it is also an option to locate the PTC thermistor close to or in contact with the second resistor R2. As described in the former embodiments, it is an option to use more than one shunt circuit 40a connected in parallel and/or more than one blocking circuit 50a connected in series.

Optionally, add a second resistor R2, a zener diode Dw, a third resistor R3 and a fourth resistor R4, even a capacitor C in this embodiment, all as same as that according to the second or the sixth embodiment, the ways of connection and the function of which are as aforesaid, which won't be reiterated.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A control circuit for a DC motor, comprising:
   a first DC port and a second DC port for connection to a DC source;
   a H-bridge driving circuit, comprising a first switch and a second switch connected in series between the first and second DC ports, and a third switch and a fourth switch connected in series between the first and second DC ports, a first output port lying between the first and the second switches and a second output port lying between the third and the fourth switches, the output ports being arranged for connection to the DC motor; and
   a shunt circuit connected between the first and second output ports and having a resistance that will decrease in response to a BEMF generated by the DC motor.

2. The control circuit of claim 1, wherein the shunt circuit comprises a varistor.

3. The control circuit of claim 2, wherein the shunt circuit further comprises a first resistor connected in series with the varistor.

4. The control circuit of claim 1, wherein the four switches are transistors having a respective control end,
   a second resistor is connected between the first and the second DC ports,
   a third resistor is connected between the control end of the first switch and the second output port, and
   a fourth resistor is connected between the control end of the third switch and the first output port.

5. The control circuit of claim 4, wherein a zener diode is connected in series with the second resistor between the first and the second DC ports.

6. The control circuit of claim 4, wherein a capacitor is connected between the first and the second DC ports.

7. The control circuit of claim 1, wherein the shunt circuit comprises a relay connected between the first and second output ports, and a control unit connected to the relay for controlling the relay to close when a voltage between the first and the second DC ports is higher than a predetermined value.

8. The control circuit of claim 7, wherein the control unit comprises a voltage detecting circuit connected between the first and second DC ports, and a controller connected to the voltage detecting circuit and the relay; the voltage detecting circuit detecting the voltage between the first and the second DC ports; and the controller controlling the relay to close when a voltage higher than a predetermined value is detected by the voltage detecting circuit.

9. A control circuit for a DC motor, comprising:
a first DC port and a second DC port for connection to a DC source;
a H-bridge driving circuit, comprising a first switch and a second switch connected in series between the first and second DC ports, and a third switch and a fourth switch connected in series between the first and second DC ports, a first output port lying between the first and the second switches and a second output port lying between the third and the fourth switches, the output ports being arranged for connection to the DC motor; and
a blocking circuit connected in series with the DC motor between the first and second output ports and having a resistance that will increase in response to a BEMF generated by the DC motor.

10. The control circuit of claim 9, wherein the blocking circuit comprises a relay connected in series with the DC motor between the first and the second output ports, and a control unit connected to the relay for controlling the relay to open when a voltage between the first and second DC ports is higher than a predetermined value.

11. The control circuit of claim 10, wherein the control unit comprises a voltage detecting circuit connected between the first and second DC ports, and a controller connected to the voltage detecting circuit and the relay; the voltage detecting circuit detecting the voltage between the first and second DC ports; and the controller controlling the relay to open when a voltage higher than a predetermined value is detected by the voltage detecting circuit.

12. The control circuit of claim 9, wherein the blocking circuit comprises a PTC thermistor connected in series with the DC motor between the first and the second output ports.

13. The control circuit of claim 12, wherein a second resistor connected between the first and the second DC ports is located close to or in contact with the PTC thermistor.

14. The control circuit of claim 12, wherein the four switches are transistors with a respective control end,
a second resistor is connected between the first and the second DC ports,
a third resistor is connected between the control end of the first switch and the second output port, and
a fourth resistor is connected between the control end of the third switch and the first output port.

15. The control circuit of claim 14, wherein a zener diode is connected in series with the second resistor between the first and second DC ports.

16. The control circuit of claim 13, wherein a zener diode is connected in series with the second resistor between the first and second DC ports.

17. The control circuit of claim 13, wherein a capacitor is connected between the first and second DC ports.

18. The control circuit of claim 9, wherein the blocking circuit comprises two transistors with contrary polarities to each other connected to respective terminals of the DC motor and in series between the first and second output ports.

19. A control circuit for a DC motor, comprising:
a first DC port and a second DC port for connection to a DC source;
a H-bridge driving circuit, comprising a first switch and a second switch connected in series between the first and second DC ports, and a third switch and a fourth switch connected in series between the first and second DC ports, a first output port lying between the first and the second switches and a second output port lying between the third and the fourth switches, the output ports being arranged for connection to the DC motor;
a shunt circuit connected between the first and second output ports and having a resistance that will decrease in response to a BEMF generated by the DC motor; and
a blocking circuit connected in series with the DC motor between the first and second output ports and having a resistance that will increase in response to a BEMF generated by the DC motor.

20. The control circuit of claim 19, wherein the four switches are transistors with a respective control end,
a second resistor and a zener diode are connected in series between the first and second DC ports,
a third resistor is connected between the control end of the first switch and the second output port,
a fourth resistor is connected between the control end of the third switch and the first output port, and
the blocking circuit comprises a PTC thermistor.

21. The control circuit of claim 20, wherein the PTC thermistor is located close to or in contact with the second resistor.

22. The control circuit of claim 19, wherein a capacitor is connected between the first and second DC ports.

23. The control circuit of claim 19, wherein the shunt circuit comprises a varistor.

24. The control circuit of claim 23, wherein the shunt circuit further comprises a first resistor connected in series with the varistor.

* * * * *